Dec. 8, 1942.  E. O. SCHWEITZER, JR  2,304,604
DYNAMO-ELECTRIC DEVICE
Filed Nov. 25, 1940  2 Sheets-Sheet 1

Inventor
Edmund O. Schweitzer, Jr.
By Brown, Jackson, Boettcher & Dienner
Attys.

Dec. 8, 1942.  E. O. SCHWEITZER, JR  2,304,604
DYNAMO-ELECTRIC DEVICE
Filed Nov. 25, 1940  2 Sheets-Sheet 2
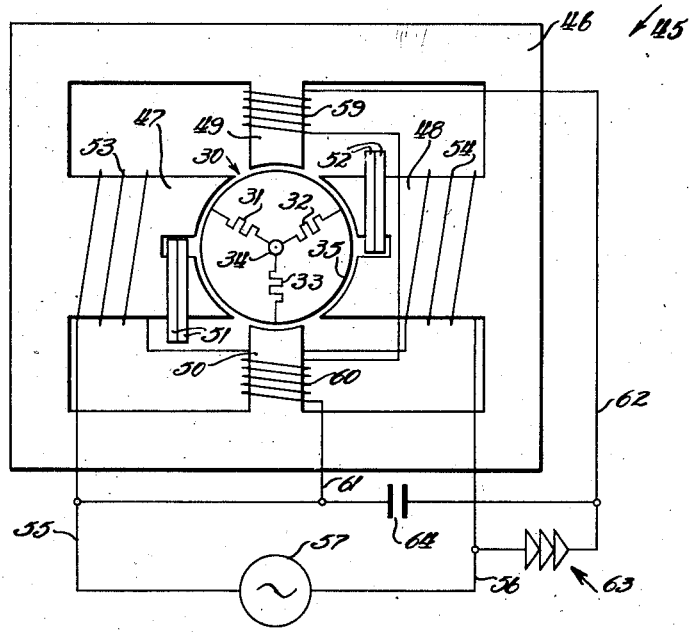
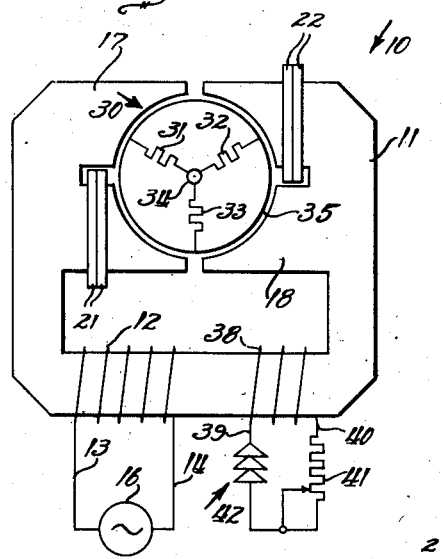
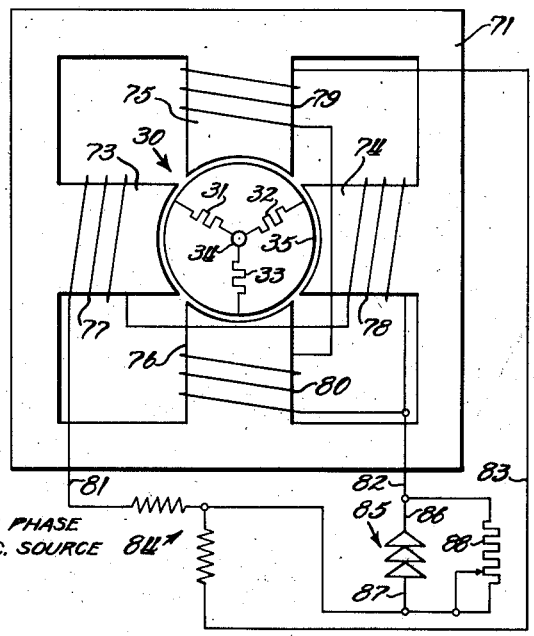
Inventor
Edmund O. Schweitzer, Jr.
By Brown, Jackson, Boettcher & Dienner. Attys.

Patented Dec. 8, 1942

2,304,604

UNITED STATES PATENT OFFICE 2,304,604

DYNAMOELECTRIC DEVICE

Edmund O. Schweitzer, Jr., Northbrook, Ill.

Application November 25, 1940, Serial No. 366,959

6 Claims. (Cl. 172—278)

My invention relates, generally, to dynamoelectric devices, and it has particular relation to synchronous motors.

An object of my invention is to provide for operating a conventional type of induction motor as a synchronous motor.

Another object of my invention is to provide in an alternating current motor a uni-directional flux component for reacting with slip frequency current in the rotor to operate the same at a synchronous speed.

A further object of my invention is to provide for superimposing a uni-directional flux component on the alternating flux component in the stator of an alternating current motor for operating its rotor at a predetermined synchronous speed.

It is another object of my invention to subject the rotor of an alternating current motor to alternating flux along one axis and to uni-directional flux along another axis angularly related to the first axis.

Other objects of my invention will, in part, be obvious and in part appear hereinafter.

For a more complete understanding of the nature and scope of my invention, reference can be had to the following detailed description, taken together with the accompanying drawings in which:

Figure 1 diagrammatically illustrates a conventional form of self-starting induction motor having circuit connections to an alternating current source in accordance with this invention so as to operate the rotor at a synchronous speed;

Figure 3 is a view, similar to that shown in Figure 2, with a modified circuit arrangement for generating the uni-directional field;

Figure 4 diagrammatically illustrates another embodiment of the invention in which the uni-directional flux component is introduced into the rotor independently of the alternating flux component; and Figure 5 diagrammatically illustrates still another embodiment of the invention in which the motor is energized from a polyphase alternating current source.

Figure 1:
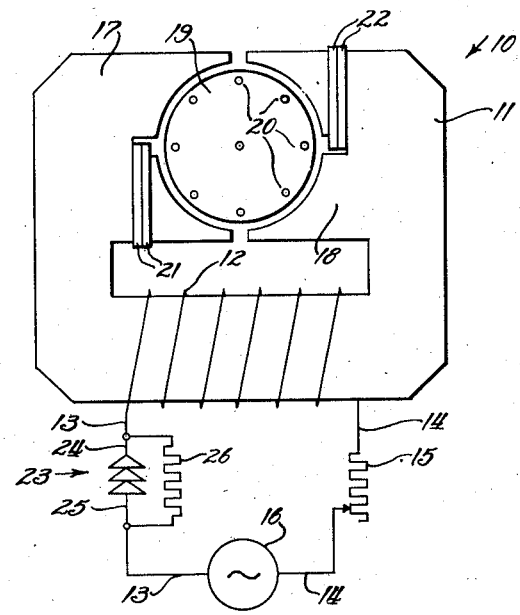

Referring now particularly to Figure 1 of the drawings, it will be observed that the reference character 10 designates, generally, a synchronous motor system arranged and constructed in accordance with the present invention. The motor 10 includes a stator 11 having a generally C-shaped configuration and formed of laminations of suitable magnetic material such as silicon steel. The stator 11 is provided with an energizing winding 12 that is connected by conductors 13 and 14 through a variable resistor 15 for energization across a source 16 of alternating current, such as a 60-cycle 110-volt source.

The opposing ends of the C-shaped stator 11 form pole members 17 and 18 having arcuate faces between which a rotor 19 is rotatably mounted. The rotor 19 is preferably formed by a stack of laminations of silicon steel and is provided with bars or conductors 20 extending through the stack and interconnected at their ends to provide a squirrel cage rotor construction.

In order to provide a self-starting construction, shading windings or rings 21 and 22 are provided in the pole members 17 and 18 respectively so as to shift a portion of the alternating flux in time and space with respect to the remaining portion of it.

The construction of the motor 10 thus far described is conventional and has been widely used for operating devices requiring relatively small amounts of power, such as electric fans and the like.

Since the motor 10 is provided with two pole members 17 and 18, the full synchronous speed of the rotor 19 is 3600 revolutions per minute or 60 revolutions per second when the source 16 is a 60-cycle source. However, the squirrel cage rotor 19 will rotate at a speed which is somewhat less than the full synchronous speed in developing sufficient power to cause its own rotation and the rotation of the load to which it may be connected.

When the revolutions per second of the squirrel cage rotor 19 equal a certain fractional part of the frequency of the alternating current source 16, then the flux produced by the current flow through the conductors 20 is stationary; that is, the positions of the poles of the magnetic field created by the rotor currents do not change because these currents alternate at the same rate as the rotor 19 turns. If the rotor 19 is then subjected to a uni-directional flux, a definite synchronous torque is produced. For example, if the two pole induction motor 10 is energized from a 60-cycle source 16 and the rotor 19 runs at a speed of thirty revolutions per second or with a 50% slip, the frequency of the rotor current will be thirty cycles per second. The two pole stator 11 induces two poles in the rotor 19 so that with the rotor 19 running at a speed of thirty revolutions per second and carrying thirty cycle current as a result of the 50% slip it will generate a two pole field of fixed polarity in fixed direction in space. This will be clear when it is recalled that the rotor is turning at the same speed as the rotor current alternates. Now if a uni-directional field is applied to the rotor 19, a synchronous torque results which prevents any change in the position of the axis of the rotor field in relation to the applied uni-directional field. The only power required of the supply generating the uni-directional field is that necessary to provide sufficient excitation, as in the case of a synchronous alternator. Also, as in the case of the synchronous alternator, the amount of direct current excitation generating the uni-directional field controls the power factor of the alternating current supplied to the motor 10. The rotor speed at which this effect occurs in revolutions per second equals the frequency of the source 16 in cycles per second divided by the number of poles of the stator 11 unless the uni-directional field is of sufficient strength to cause the rotor to skip a cycle. In Figure 1, as above indicated, this speed is thirty revolutions per second. With a sufficiently strong uni-directional field, the rotor will skip a cycle, the current induced therein will have a frequency of forty cycles per second and it will run at a speed of twenty revolutions per second or 1200 revolutions per minute.

With a view to providing the uni-directional flux component for interacting with the stationary rotor field a direct current component can be superimposed on the alternating current component in the energizing winding 12. As will hereinafter appear, a separate winding can be employed which is energized entirely by direct current. In either case, a uni-directional flux component is superimposed on the alternating flux component in the stator 11.

The direct current component can be supplied by means of a rectifier, shown generally at 23, which may be of the copper oxide type, that is connected by conductors 24 and 25 in series circuit relation with the conductor 13. A by-pass resistor 26 is shunted around the rectifier 23 so as to permit the passage of alternating current through the winding 12 as well as direct current through the rectifier 23. As will hereinafter appear, the effect of the rectifier 23 is to shift the axis of the alternating current supplied to the winding 12 above or below its normal axis, depending upon the connections to the rectifier 23. Instead of the rectifier 23 of the type illustrated, it will be understood that other types of rectifiers can be employed. Also, a battery can be employed in lieu of the rectifier 23.

It will now be apparent that a conventional type of squirrel cage induction motor 10 can be caused to operate at synchronous speeds of 1800 or 1200 revolutions per minute. This can be done either by superimposing a direct current component on the alternating current component in the winding 12 or by providing a separate winding on the stator 11 for generating therein the uni-directional flux for interacting with the stationary field generated by the rotor current in the conductors 20 of the squirrel cage winding. As a result, the low cost and simplicity of the conventional induction motor construction is retained and, in addition, it is caused to operate at a definite fixed speed without in any way impairing the good starting torque characteristics of the induction motor.

When the motor 10 is energized from the alternating current source 16 through the rectifier 23 and the resistor 26, the rotor 19 revolves at a synchronous speed of thirty revolutions per second. At this speed, as set forth hereinbefore, the field generated by the rotor current is stationary. The conductors 20 cutting the uni-directional field have eddy currents generated in them which tend somewhat to act as a drag on the rotor 19. In order to avoid this undesirable drag, the motor construction shown in Figure 2 can be employed. It will be observed that, except for the rotor indicated generally at 30, the motor system shown in Figure 2 is identical with that shown in Figure 1.

The rotor 30, instead of employing a relatively large number of bars, as in the conventional squirrel cage construction, employs only three bars or conductors 31, 32, and 33 which are conventionally shown as resistors. The bars 31, 32, and 33 are uniformly spaced about the rotor 30 parallel to its axis and, in effect, form a squirrel cage construction which, because of the provision of the three conductors, furnishes a three phase rotor construction. At one end the bars 31, 32, and 33 are interconnected by a low resistance conductor 34 which may be in the form of a relatively thick disc of copper. The other ends of the bars 31, 32, and 33 are interconnected by a relatively high resistance connection 35 that may be provided by a relatively thin disc of copper. Thus the bars 31, 32, and 33 form a star connected squirrel cage rotor construction. The mechanical arrangement of the parts making up the rotor 30, except for the magnetic core, is shown in Figure 2A.

Figure 2:
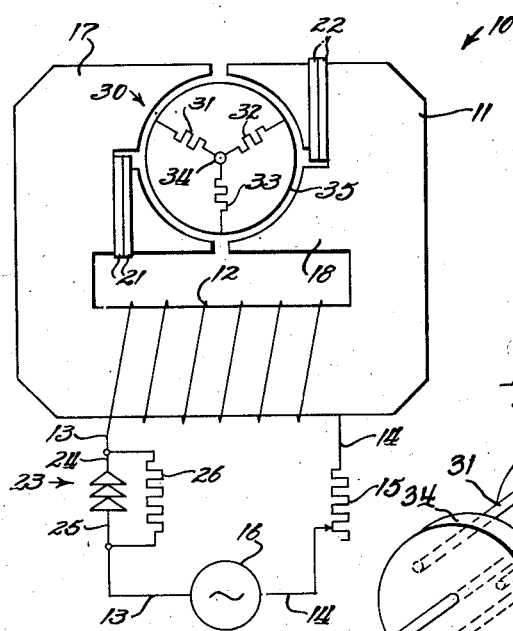
Figure 2 is a view, similar to that shown in Figure 1, illustrating another form of rotor construction.
Figure 2A:
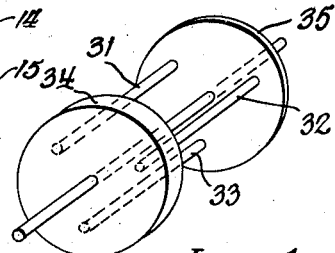
Figure 2A is a perspective view of the rotor bars and end discs shown in Figure 2 and the following figures, the magnetic core being omitted for the sake of clarity.

In Figure 3 of the drawings, the motor 10 is essentially the same as shown in Figure 2 except for the means for generating the uni-directional flux in the stator 11. For this purpose, in Figure 3, an auxiliary winding 38 is provided on the stator 11. The winding 38 is inductively related to the winding 12 and preferably is arranged symmetrically therewith. For illustrative purposes, it is shown as being spaced from the winding 12. The auxiliary winding 38 is connected by conductors 39 and 40 through a variable resistor 41 to a rectifier shown generally at 42. The rectifier 42 is of the type previously described, and it serves to permit the flow through the auxiliary winding 38 of half cycles of one polarity and prevents flow therethrough of half cycles of opposite polarity. In this manner the auxiliary winding 38 is energized with uni-directional current which generates a uni-directional flux component for operating the rotor 30 at a synchronous speed. The rotor 30 will operate at a speed of 1200 revolutions per minute, or at a speed of 1800 revolutions per minute, depending upon the strength of the uni-directional flux as controlled by the variable resistor 41.

In Figure 4 of the drawings, the motor construction illustrated, generally, at 45, is so arranged as to introduce the uni-directional flux component independently of the alternating flux component. As there shown, the motor 45 comprises a stator 46 that is made up of generally rectangular laminations of magnetic material, such as silicon steel. The stator 46 is so constructed that main pole members 47 and 48 extend radially inwardly from two sides, and auxiliary pole members 49 and 50 extend radially inwardly from the other two sides, all of the pole members converging on the rotor 30, which has the same construction as previously described in connection with Figure 2 of the drawings. Shading windings or rings 51 and 52 are provided on the main pole members 47 and 48 to make the rotor 30 self-starting.

Main windings 53 and 54 are provided on the main pole members 47 and 48, respectively, and are connected in series circuit relation and, by conductors 55 and 56, are connected across a source 57 of alternating current, such as a 60-cycle 110-volt source. It will be understood that the axis of the alternating flux extends between the main pole members 47 and 48 through the rotor 30.

The auxiliary pole members 49 and 50 are provided for carrying the uni-directional flux, and it will be observed that its axis is substantially at right angles to the axis of the alternating flux. The auxiliary pole members 49 and 50 are energized by auxiliary windings 59 and 60 thereon which are connected in series circuit relation, and by conductors 61 and 62 through a rectifier 63 across the alternating current source 57. A capacitor 64 is connected across the conductors 61 and 62 in order to smooth out the wave form of the direct current applied for energizing the auxiliary windings 59 and 60. Obviously, instead of the rectifier 63 of the copper oxide type illustrated, other types of rectifiers can be employed. Also, the auxiliary windings 59 and 60 can be energized from a separate current source such as provided by a battery, as will be readily understood.

In Figure 5 of the drawings, another embodiment of the invention is disclosed. The motor shown generally at 70 comprises a stator 71 that is formed by a generally rectangular stack of laminations which are so shaped as to provide two pairs of pole members 73—74 and 75—76 which project inwardly toward a rotor 30 that is similar to the rotor 30 shown in Figure 2 of the drawings and previously described. Windings 77 and 78 are provided on the pole members 73 and 74, respectively, and are connected in series circuit relation. Likewise, windings 79 and 80 are provided on pole members 75 and 76, and they are connected in series circuit relation. The windings 78 and 80 are commonly connected and they, together with the windings 77 and 79, are connected by conductors 81, 82, and 83 for energization to a two phase alternating current source indicated generally at 84. The foregoing construction provides a polyphase squirrel cage motor construction in which shading rings, such as shown at 21 and 22 in Figures 2 and 3 of the drawings, are not required for starting purposes.

In order to provide the uni-directional flux component, a rectifier, shown generally at 85, is connected by conductors 86 and 87 in conductor 82. The rectifier 85 is shunted by a variable resistor 88 so as to permit the flow of alternating current as well as the direct current from the rectifier 85.

Since certain further changes can be made in the foregoing described constructions and circuit connections and different embodiments of the invention can be made without departing from the scope thereof, it is intended that all matter shown in the accompanying drawings and described hereinbefore shall be interpreted as illustrative and not in a limiting sense.

I claim as my invention:

1. A synchronous alternating current motor comprising, in combination, a stator, winding means on said stator, circuit means for connecting said stator winding means to an alternating current source to generate in said stator an alternating flux component, a rotor disposed in cooperative relation to said stator, winding means on said rotor in which current is induced having a frequency determined by the rotor speed, additional winding means on said stator inductively coupled to the first mentioned winding means, rectifier means, and circuit means shunting said additional winding means through said rectifier means for causing uni-directional current to flow therethrough to generate in said stator a uni-directional flux for interacting with the flux generated by current flow in said rotor winding means to effect rotation of said rotor at a predetermined fixed speed.

2. An alternating current motor comprising, in combination, a rotor including only three rotor bars uniformly spaced about its periphery and interconnected at one end by relatively high resistance conducting means and at the other end by relatively low resistance conducting means to provide a star connection, a stator in cooperative relation to said rotor, winding means on said stator, and circuit means for connecting said winding means for energization to an alternating current source.

3. A synchronous alternating current motor comprising, in combination, a rotor including rotor bars interconnected at one end by relatively high resistance end ring and at the other end by relatively low resistance end ring, a stator in cooperative relation to said rotor, winding means on said stator, circuit means for connecting said winding means for energization to an alternating current source to generate in said stator and rotor alternating flux components, and means for generating a uni-directional flux component in said stator for interacting with the alternating flux component in said rotor to effect rotation of the same at a synchronous speed.

4. A synchronous alternating current motor comprising, in combination, a squirrel cage rotor, a two pole stator in cooperative relation to said rotor, winding means on said stator, circuit means for connecting said winding means to a source of single phase alternating current having a frequency of 60 cycles per second whereby said rotor tends to run at a speed approaching 60 revolutions per second, and means for generating a uni-directional flux component in said stator for interacting with the alternating flux component in said rotor to effect rotation of the same at either 20 or 30 revolutions per second depending upon the magnitude of said uni-directional flux.

5. A synchronous alternating current motor comprising, in combination, a squirrel cage rotor having only three rotor bars uniformly spaced about its periphery and connected together at one end with relatively low resistance means providing with said bars a star connection and at the other end with relatively high resistance means, a two pole stator in cooperative relation to said rotor, winding means on said stator, circuit means for connecting said winding means to a source of single phase alternating current having a frequency of 60 cycles per second whereby said rotor tends to run at a speed approaching 60 revolutions per second, and means for generating a unidirectional flux component in said stator for interacting with the alternating flux component in said rotor to effect rotation of the same at either 20 or 30 revolutions per second depending upon the magnitude of said uni-directional flux.

6. A synchronous alternating current motor comprising, in combination, a squirrel cage rotor having only three rotor bars uniformly spaced about its periphery and interconnected at one end by relatively high resistance conducting means and at the other end by relatively low resistance conducting means to provide a star connection, a two pole stator in cooperative relation to said rotor, winding means on said stator, circuit means for connecting said winding means to a source of single phase alternating current having a frequency of 60 cycles per second whereby said rotor tends to run at a speed approaching 60 revolutions per second, and means for generating a uni-directional flux component in said stator for interacting with the alternating flux component in said rotor to effect rotation of the same at either 20 or 30 revolutions per second depending upon the magnitude of said uni-directional flux.

EDMUND O. SCHWEITZER, Jr.